(12) United States Patent
Sekiya et al.

(10) Patent No.: US 6,330,928 B1
(45) Date of Patent: Dec. 18, 2001

(54) DRIVING FORCE CONTROL DEVICE FOR FOUR-WHEEL DRIVE VEHICLE

(75) Inventors: Shigenobu Sekiya; Hiroyuki Matsuo; Keiichi Takahashi; Yasunori Arai, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/584,738

(22) Filed: Jun. 1, 2000

(30) Foreign Application Priority Data

Jun. 2, 1999 (JP) ................................... 11-154462

(51) Int. Cl.⁷ ................................................. B60K 17/35
(52) U.S. Cl. .......................... 180/242; 180/249; 180/197; 192/103 F
(58) Field of Search ..................... 180/242, 243, 180/248, 249, 197; 192/103 F, 85 AA; 701/67, 89

(56) References Cited

U.S. PATENT DOCUMENTS

| 5,219,038 | * | 6/1993 | Hamada et al. | 180/248 |
| 5,875,865 | * | 3/1999 | Wakahara et al. | 180/248 |
| 5,890,574 | * | 4/1999 | Takahashi | 192/35 |
| 5,967,285 | * | 10/1999 | Mohan et al. | 192/103 F |
| 6,182,810 | * | 2/2001 | Kwoka | 192/58.42 |
| 6,196,348 | * | 3/2001 | Yano et al. | 180/242 |

FOREIGN PATENT DOCUMENTS 3-224830   10/1991   (JP).

* cited by examiner

Primary Examiner—Avraham H. Lerner
(74) Attorney, Agent, or Firm—Arent Fox Kintner Plotkin & Kahn, PLLC

(57) ABSTRACT

A driving force control device for a four-wheel drive vehicle including one pair of front or rear driven wheels which are driven directly by a prime mover and another pair of front or rear driven wheels which are driven via a hydraulic clutch, a first hydraulic pump which is driven by being operatively connected to the one pair of driven wheels, and a second hydraulic pump which is driven by being operatively connected to the other pair of driven wheels. The engagement force of the hydraulic clutch is controllable based on the difference in rotation of the first and second hydraulic pumps. The torque transmission to the other pair of the front or rear driven wheels can thus be controlled according to the driving conditions of the vehicle. The engagement force of the hydraulic clutch is controlled by an engagement force control unit by selecting from multiple engagement characteristics, in which the responsiveness of the torque transmitted by the hydraulic clutch is varied, according to the driving conditions of the vehicle.

4 Claims, 7 Drawing Sheets

DRIVING FORCE CONTROL DEVICE FOR FOUR-WHEEL DRIVE VEHICLE

BACKGROUND OF THE INVENTION

1. Field of the Invention

The present invention relates to four-wheel drive vehicles comprising a pair of front or rear driven wheels which are driven directly by a prime mover and another pair of front or rear driven wheels which are driven via a hydraulic clutch. A first hydraulic pump is driven by being operatively connected to the pair of driven wheels and a second hydraulic pump is driven by being operatively connected to the other driven wheels. The engagement force of the hydraulic clutch is controllable according to the difference in rotation between the first and the second hydraulic pumps.

2. Description of the Prior Art

The use of a two-wheel drive state using only one pair of front or rear driven wheels during normal travel is known in the art, and when a difference in rotation between the front and the rear wheels occurs both pairs of front and rear driven wheels are driven together so as to enhance the travel stability. If the difference in rotation between the front and the rear wheels is maintained so as to be small all the time, a tight brake phenomenon is caused when turning at a low speed causing the driver to feel uncomfortable and, moreover, it is necessary to increase the strength of the components used for transmitting the driving force between the front and the rear wheels, thus increasing the weight of the vehicle. It is disclosed in Japanese Patent Application Laid-open No. 3-224830 that the front wheels are always driven. When the difference in rotation between the front and the rear wheels is small, the torque transmitted to the rear wheels is made small, and the torque transmitted to the rear wheels is increased according to increases in the difference in rotation, and thus the above-mentioned problems are solved.

However, on a road surface having a low coefficient of friction such as a snow-covered road it is desirable to increase the amount of torque transmitted to the rear wheels even when the difference in rotation between the front and the rear wheels is small, but in the above-mentioned system the amount of torque transmitted to the rear wheels remains small when the difference in rotation between the front and the rear wheels is small, and thus the objective cannot be obtained.

SUMMARY OF THE INVENTION

The present invention has been conducted in view of the above-mentioned circumstances, and it is an object of the present invention, with regard to a four-wheel drive vehicle wherein one pair of front or rear driven wheels are always driven and the driving force of the other pair of front or rear driven wheels is controllable, to provide a driving force control device for a four-wheel drive vehicle in which the torque transmitted to the other pair of the front or rear driven wheels can be controlled according to the driving conditions of the vehicle.

In order to achieve this object, the invention is characterized in that a driving force control device is provided for a four-wheel drive vehicle which comprises one pair of front or rear driven wheels which are driven directly by a prime mover, and another pair of front or rear driven wheels which are driven via a hydraulic clutch. A first hydraulic pump which is driven is operatively connected to the one pair of driven wheels, and a second hydraulic pump which is driven, is operatively connected to the other pair of driven wheels. The engagement force of the hydraulic clutch is controllable based on the difference between the discharge and intake amounts of the first and second hydraulic pumps due to the difference in rotation of the two hydraulic pumps, such that the engagement force increases according to an increase in the difference between the discharge and intake amounts. The driving force control device includes an engagement force control means for controlling the engagement force of the hydraulic clutch by selecting from multiple engagement characteristics in which the responsiveness of the torque transmission by the hydraulic clutch is varied according to the driving conditions of the vehicle.

In accordance with this arrangement, since the engagement force of the hydraulic clutch is controlled by the engagement force control means by selecting an engagement characteristic according to the driving conditions of the vehicle, the responsiveness of the torque transmission by the hydraulic clutch can be controlled according to the driving conditions of the vehicle.

The invention is further characterized in that a hydraulic oil supply passage which carries the hydraulic oil produced according to the difference between the discharge and intake amounts of the first and second hydraulic pumps, is connected to a hydraulic oil pressure chamber in the hydraulic clutch. The engagement force control means includes an orifice provided through a drain oil passage for draining the hydraulic oil in the hydraulic oil pressure chamber and a switching valve provided between the orifice and the hydraulic oil pressure chamber.

In accordance with this arrangement of the invention, when the switching valve is open, since the engagement force of the hydraulic clutch relative to the difference in rotation between the first and second hydraulic pumps is determined by the reduction in the amount of oil drained by the orifice, the responsiveness of the torque transmission is low, whereas when the switching valve is closed, since the hydraulic oil is prevented from draining from the hydraulic oil pressure chamber, the engagement force of the hydraulic clutch relative to the difference in rotation between the first and second hydraulic pumps, increases thus enhancing the responsiveness of the torque transmission, and the arrangement of the engagement force control means can therefore be simplified.

In addition, the engagement force control means includes a bypass connecting the orifice and the hydraulic oil pressure chamber when bypassing the switching valve, and a relief valve is provided in the bypass so that it opens in the event that the oil pressure at the side of the hydraulic oil pressure chamber, is at or above a predetermined level. In accordance with this arrangement, an upper limit for the oil pressure of the hydraulic oil pressure chamber in a state in which the responsiveness of the torque transmission by the hydraulic clutch is enhanced by closure of the switching valve, that is, an upper limit for the torque transmitted by the hydraulic clutch, is determined by the valve opening pressure for the relief valve and thus excess torque transmission by the hydraulic clutch in a state where there is enhanced responsiveness, can be prevented by a simple arrangement.

The invention, in addition to the arrangement above is characterized in that a control unit for controlling the motion of the engagement force control means comprises a slip detecting means for detecting the slip of the one pair of front or rear driven wheels, a starting status detecting means for detecting the starting status of the vehicle, a counter for counting the number of times that the starting status is detected by the starting status detecting means, and an engagement characteristic selecting means for selecting an engagement characteristic in which the responsiveness of the torque transmission by the hydraulic clutch is enhanced until the count number of the counter reaches a predetermined number after the slip is detected by the slip detecting means.

In accordance with this arrangement of the invention, when the slip detecting means detects the slip in one pair of the front or rear driven wheels, the responsiveness of the torque transmission by the hydraulic clutch is enhanced until the number of times that the starting status is detected by the starting status detecting means reaches a predetermined number. That is, when slip is caused in one pair of the front or rear driven wheels on a road surface having a low coefficient of friction such as a snow-covered road, the responsiveness of the torque transmission is enhanced until the number of times that the vehicle is started reaches a predetermined number by assuming that the vehicle will continue to travel on the road surface having a low coefficient of friction for a while. Thus the mobility of the vehicle can be enhanced. When slip is caused again in one pair of the front or rear driven wheels, the responsiveness of the torque transmission is enhanced until the number of times that the vehicle is started after the slip has recurred reaches the predetermined number. Thus it can deal with continuous travel on a road surface having a low coefficient of friction. Furthermore, when leaving a road surface having a low coefficient of friction, the engagement force of the hydraulic clutch is controlled so as to employ an engagement characteristic having low responsiveness corresponding to a normal paved road, etc. unless slip occurs even when the vehicle has started a predetermined number of times.

BRIEF DESCRIPTION OF THE DRAWINGS

FIG. 1 is a diagram showing a power transmission system of a four-wheel drive vehicle.

FIG. 2 is a diagram of a hydraulic circuit relating to a hydraulic clutch.

FIG. 3 is a cross sectional view showing the structure of an orifice.

FIG. 4 is a block diagram showing the arrangement of a control unit.

FIG. 5 is a flow chart showing the procedure for selecting an engagement characteristic of a hydraulic clutch.

FIG. 6 is a flow chart showing the procedure for controlling a switching valve.

FIG. 7 is a graph of the engagement characteristics of a hydraulic clutch.

BRIEF DESCRIPTION OF THE PREFERRED EMBODIMENT

Figure 1:
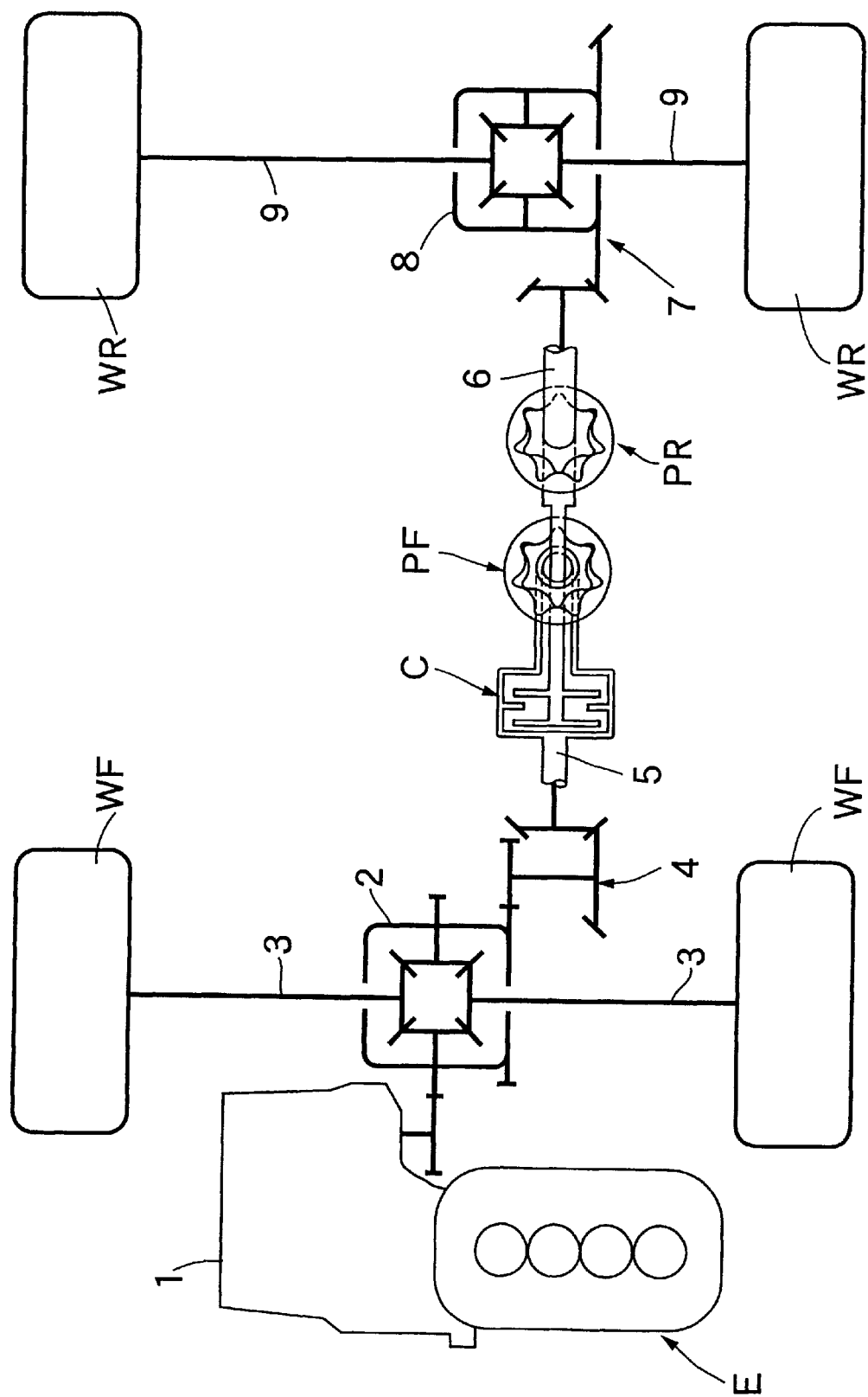
FIG. 1 to FIG. 7 illustrate an embodiment of the present invention.

In FIG. 1 the output from an engine E as the prime mover mounted in the front part of a vehicle, is applied into a front differential 2 via a transmission 1. The output from the front differential 2 is transmitted to right and left front wheels WF, WF, which are driven wheels, via drive shafts 3, 3. Furthermore, the output from the engine E which has been applied to the front differential 2 is transmitted to an input shaft 5 of a hydraulic clutch C via a bevel gear 4 and the power output from an output shaft 6 of the hydraulic clutch C, is transmitted to right and left rear wheels WR, WR which are driven wheels via a bevel gear 7, a rear differential 8 and drive shafts 9, 9.

That is, while the right and left front wheels WF, WF, which are one pair of front or rear driven wheels, are driven directly by the engine E, the right and left rear wheels WR, WR which are the other pair of front or rear driven wheels, are driven via the hydraulic clutch C.

The engagement force of the hydraulic clutch C increases according to an increase in the difference between the discharge and intake amounts of a first hydraulic pump PF and a second hydraulic pump PR, which are trochoid pumps, due to the difference in rotation between the two hydraulic pumps PF, PR. The first hydraulic pump PF is driven by the input shaft 5 which is operatively connected to the front wheels WF, WF, and the second hydraulic pump PR is driven by the output shaft 6 which is operatively connected to the rear wheels WR, WR.

Figure 2:
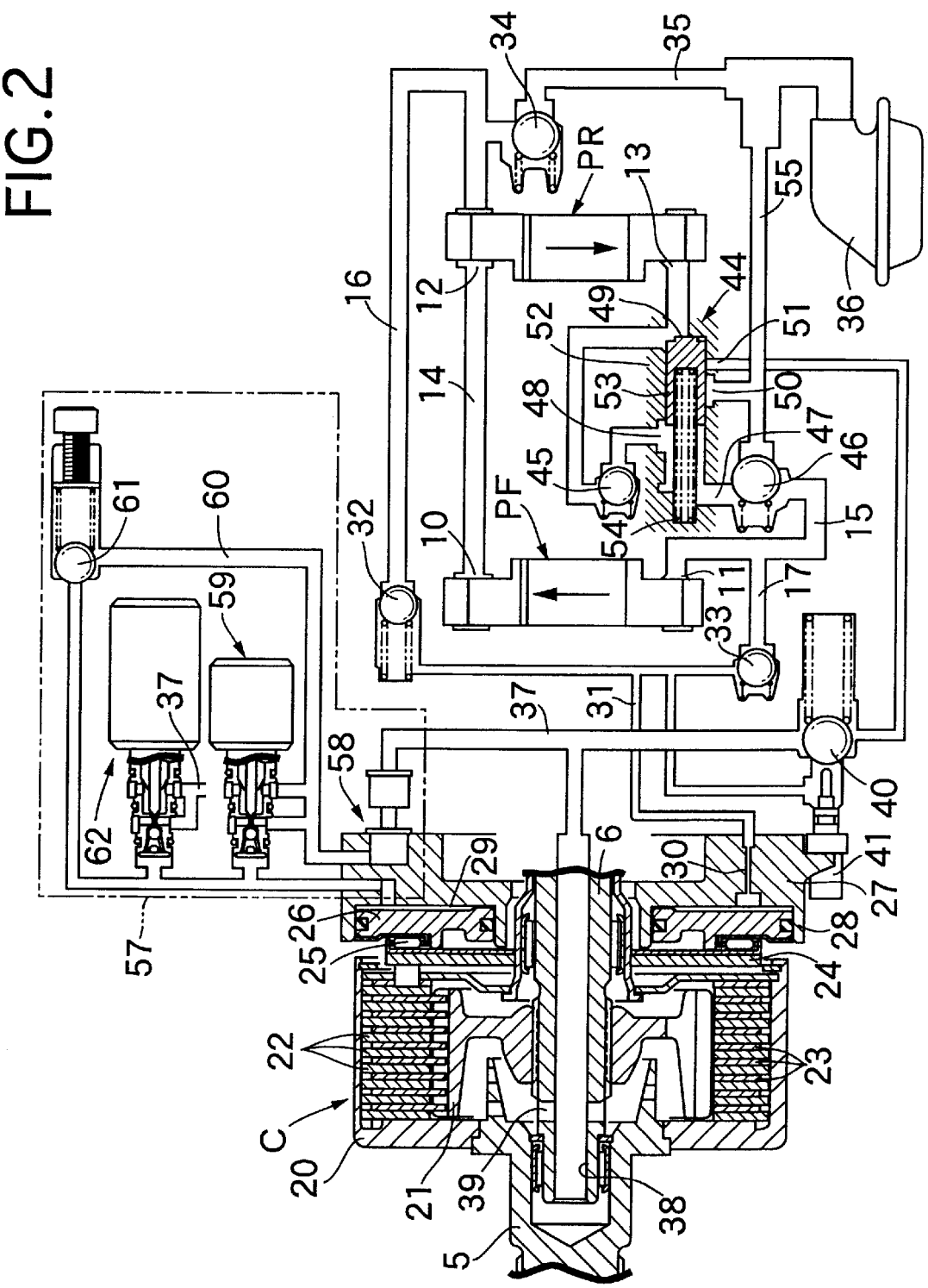

In FIG. 2 the discharge directions of the first and second hydraulic pumps PF, PR, which are trochoid pumps, are reversed between the time when the vehicle is traveling forwards and the time when it is traveling in reverse, and the arrows of the two hydraulic pumps PF, PR in FIG. 2 show the discharge directions when the vehicle is traveling forwards.

The first hydraulic pump PF comprises a first port 10 which becomes a discharge port when the vehicle is traveling forwards and an intake port when it is in reverse and a second port 11 which becomes an intake port when the vehicle is traveling forwards and a discharge port when it is in reverse. The second hydraulic pump PR comprises a third port 12 which becomes an intake port when the vehicle is traveling forwards and a discharge port when it is in reverse and a fourth port 13 which becomes a discharge port when the vehicle is traveling forwards and an intake port when it is in reverse. The amounts of discharge per rotation of the two hydraulic pumps PF, PR is set so that it is slightly larger for the second hydraulic pump PR (e.g. 2.5% larger) than for the first hydraulic pump PF.

The first port 10 of the first hydraulic pump PF and the third port 12 of the second hydraulic pump PR are connected via a first oil passage 14, and the second port 11 of the first hydraulic pump PF and the fourth port 13 of the second hydraulic pump PR are connected via a second oil passage 15. Moreover, a third oil passage 16 is connected to the first oil passage 14 and a fourth oil passage 17 is connected to the second oil passage 15.

The hydraulic clutch C comprises an outer clutch portion 20 fixed to the input shaft 5, an inner clutch portion 21 fixed to the output shaft 6 whose front end is coaxially fitted into the rear end of the input shaft 5 in a relatively rotatable manner, multiple clutch plates 22 which are spline-connected to the inner circumference of the outer clutch portion 20, and multiple clutch plates 23 which are spline-connected to the outer circumference of the inner clutch portion 21. The clutch plates 22 and 23 are superimposed so that they can make contact with each other.

The clutch plates 22 and 23 are pressed by a pressure plate 24 in a direction such that they make contact with each other and are engaged by means of friction. A clutch piston 26 is provided on the reverse surface of the pressure plate 24 via a roller bearing 25, the clutch piston 26 fits in a slidable manner in a clutch cylinder 28 provided on a fixed casing 27, and a hydraulic oil pressure chamber 29 is formed between the casing 27 and the clutch piston 26.

The engagement force of the hydraulic clutch C, that is, the amount of torque transmitted from the engine E to the two rear wheels WR, WR is therefore determined by the oil pressure of the hydraulic oil pressure chamber 29.

A hydraulic oil supply passage 31 is connected to the hydraulic oil pressure chamber 29 via a choke type constriction 30, the third oil passage 16 is connected to the hydraulic oil supply passage 31 via a first one-way valve 32 which only allows the flow of hydraulic oil towards the hydraulic oil supply passage 31, and the fourth oil passage 17 is connected to the hydraulic oil supply passage 31 via a second one-way valve 33 which only allows the flow of hydraulic oil towards the hydraulic oil supply passage 31. A fifth oil passage 35 leading to an oil tank 36 and the third oil passage 16 are connected via a third one-way valve 34 which only allows the flow of hydraulic oil from the fifth oil passage 35 to the third oil passage 16.

The hydraulic oil in the hydraulic oil pressure chamber 29 is drained through a drain oil passage 37, and this drain oil passage 37 is connected to a lubricating oil passage 38 which is provided coaxially on the output shaft 6. The lubricating oil passage 38 is connected to the inside of the hydraulic clutch C via multiple oil pores 39 provided on the side wall of the output shaft 6 and the interior of the hydraulic clutch C is lubricated by the hydraulic oil which has been drained into the drain oil passage 37.

The hydraulic oil supply passage 31 and the drain oil passage 37 are connected via a first relief valve 40, and a thermoswitch 41 is attached to the first relief valve 40, and opens the first relief valve 40 in response to an increase in the oil temperature.

A spool valve 44, a fourth one-way valve 45 and a fifth one-way valve 46 are provided in the second oil passage 15. The spool valve 44 comprises a valve housing 52 having a first input port 47, a first output port 48, a second input port 49, a second output port 50 and an escape port 51. A spool 53 fits in a slidable manner in the valve housing 52 to make the oil pressure of the second input port 49 work on one end thereof in the axial direction and the oil pressure of the first input port 47 on the other end thereof in the axial direction, and a spring 54 is provided between the valve housing 52 and the spool 53 and exhibits a spring force that forces the spool 53 to one side in the axial direction.

The first input port 47 is linked to the second port 11 of the first hydraulic pump PF and the first output port 48 is connected to the fourth port 13 of the second hydraulic pump PR via the fourth one-way valve 45. The second input port 49 is linked to the fourth port 13 of the second hydraulic pump PR, and the second output port 50 is connected to the second port 11 of the first hydraulic pump PF via the fifth one-way valve 46. The escape port 51 is provided on the valve housing 52 so that it is linked to the second input port 49 while the second input port 49 and the second output port 50 are linked to each other, and the escape port 51 is also linked to the drain oil passage 37.

The fourth one-way valve 45 only allows the flow of hydraulic oil from the first output port 48 to the fourth port 13, and the fifth one-way valve 46 only allows the flow of hydraulic oil from the second output port 50 to the second port 11.

A point between the second output port 50 and the fifth one-way valve 46 is linked to the oil tank 36 and the fifth oil passage 35 via a sixth oil passage 55, and the fourth oil passage 17 is linked to the second oil passage 15 between the second port 11 of the first hydraulic pump PF and the first input port 47 of the spool valve 44.

In the spool valve 44, when the vehicle is in reverse, that is, when the second port 11 of the first hydraulic pump PF is discharging hydraulic oil, the spool 53 is positioned rightwards as shown in the figure, the first input port 47 is linked to the first output port 48, while the second output port 50 and the escape port 51 are cut off from the second input port 49; when the vehicle is traveling forwards, that is, when the fourth port 13 of the second hydraulic pump PR is discharging hydraulic oil, the spool 53 is positioned leftwards, the second output port 50 and the escape port 51 are linked to the second input port 49 while the first output port 48 is cut off from the first input port 47.

The engagement force of the hydraulic clutch C is controlled by an engagement force control means 57, and the engagement force control means 57 comprises an orifice 58 provided on the drain oil passage 37 for draining the hydraulic oil from the hydraulic oil pressure chamber 29 in the hydraulic clutch C, a switching valve 59 which is a normally open type electromagnetic valve provided between the orifice 58 and the hydraulic oil pressure chamber 29, a by-pass 60 joining the orifice 58 to the hydraulic oil pressure chamber 29 when bypassing the switching valve 59, a second relief valve 61 provided on the by-pass 60 so as to open in the event that the oil pressure on the hydraulic oil pressure chamber 29 side reaches a predetermined level or higher, and a normally closed type electromagnetic valve 62 provided between the hydraulic oil pressure chamber 29 and the drain oil passage 37.

Figure 3:
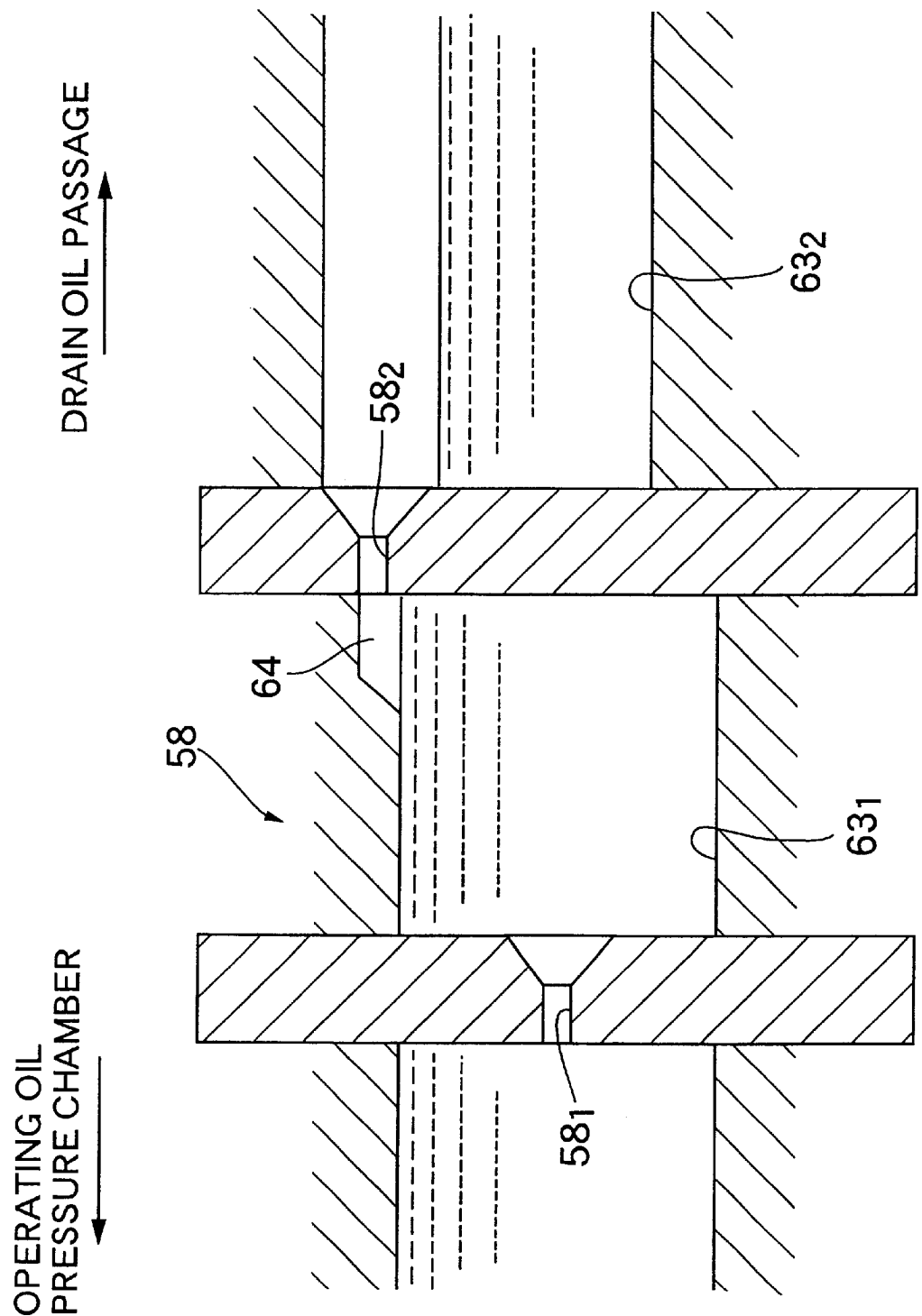

In FIG. 3 the orifice 58 is formed from a first orifice $58_1$ on the upstream side (the side of the hydraulic oil pressure chamber 29) and a second orifice $58_2$ on the downstream side (the side of the drain oil passage 37). An upstream side oil passage $63_1$ provided between the first and second orifices $58_1$, $58_2$ is formed such that it is positioned at a level slightly lower than that of a downstream side oil passage $63_2$ which is separated from the upstream side oil passage $63_1$ by the second orifice $58_2$, and the second orifice $58_2$ is provided to stretch between an air pocket 64 formed on the upper part of the upstream oil passage $63_1$ and the vicinity of the upper wall of the downstream side oil passage $63_2$.

In accordance with the orifice 58 having such an arrangement, even if air which flows back in the drain oil passage 37 from the inside of the hydraulic clutch C, passes through the second orifice $58_2$, it will be trapped in the air pocket 64 and thus the back flow of air into the hydraulic oil pressure chamber 29 can be prevented.

The switching valve 59 switches between a valve open state, in which hydraulic oil is discharged from the hydraulic oil pressure chamber 29 while regulating the amount of discharge by means of the orifice 58 so as to reduce the responsiveness of torque transmission of the hydraulic clutch C, and a valve closed state, in which the hydraulic oil is prevented from discharging from the hydraulic oil pressure chamber 29 to enhance the responsiveness of torque transmission of the hydraulic clutch C. Moreover, the normally closed type electromagnetic valve 62 discharges hydraulic oil from the hydraulic oil pressure chamber 29 without restriction when it is open so that the hydraulic clutch C is disengaged and a two-wheel drive state using the right and left front wheels WF, WF alone is brought about.

Figure 4:
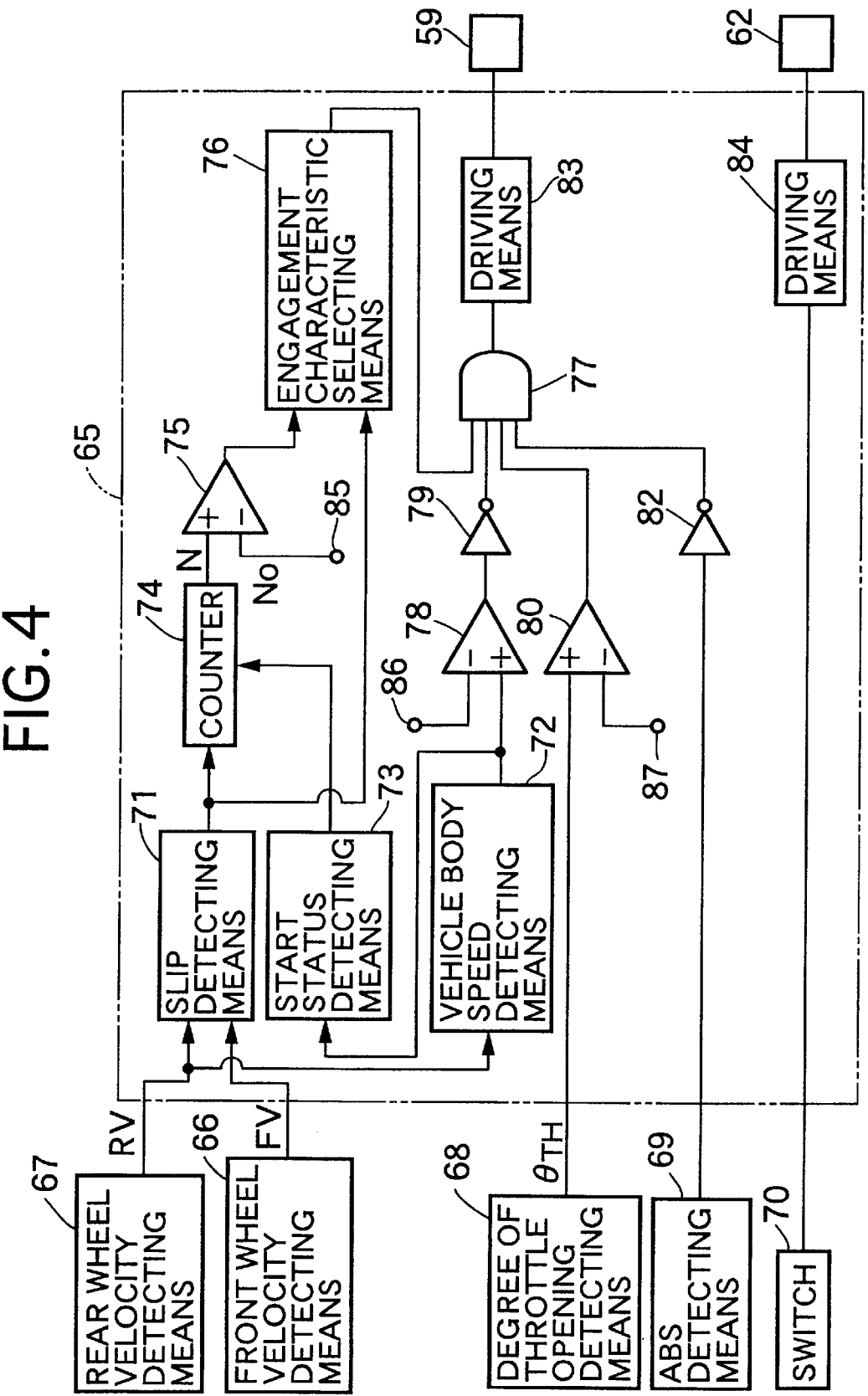

In FIG. 4, the opening and closing motion of the switching valve 59 and the opening and closing motion of the normally closed type electromagnetic valve 62 in the engagement force control means 57 are controlled by the control unit 65, and in order to operate the switching valve 59 and the normally closed type electromagnetic valve 62, the control unit 65 receives inputs relating to the front wheel velocity FV detected by a front wheel velocity detecting means 66, the rear wheel velocity RV detected by a rear wheel velocity detecting means 67, the degree of throttle opening $\theta_{TH}$ detected by a degree of throttle opening detecting means 68, the presence of an antilock brake motion detected by an ABS detecting means 69 and a switch signal from a switch 70.

The control unit 65 comprises a slip detecting means 71, a vehicle body speed detecting means 72, a starting status detecting means 73, a counter 74, a comparator 75, an engagement characteristic selection means 76, an AND gate 77, a comparator 78, a NOT circuit 79, a comparator 80, a NOT circuit 82 and driving means 83, 84.

The slip detecting means 71 detects the slip in a front wheel WF based on the front wheel velocity FV detected by the front wheel velocity detecting means 66 and the rear wheel velocity RV detected by the rear wheel velocity detecting means 67, and it determines that slip is present in the front wheel WP when the difference between the front wheel velocity FV and the rear wheel velocity RV is at least at a predetermined level. The predetermined level is set to be larger (for example, 3 km/h) than the difference in velocity caused by the difference between the inside wheels of the front wheels WF and the rear wheels WR when the vehicle is turning, and mistakenly determining that slip is occurring in the front wheels WF when the vehicle is turning on a road surface having a high coefficient of friction can therefore be avoided.

The vehicle body speed detecting means 72 detects the vehicle body speed based on the rear wheel velocity RV detected by the rear wheel velocity detecting means 67.

The starting status detecting means 73 detects the starting status of the vehicle based on the vehicle body speed detected by the vehicle body speed detecting means 72, and determines that the vehicle has started when there is a change in the vehicle body speed, for example, from 5 km/h or less to 20 km/h or more, then outputting a high level signal.

The counter 74 counts the number of times that the starting status is detected by the starting status detecting means 73, and the count number of the counter 74 is reset in the event that slip is detected in a front wheel WF by the slip detecting means 71.

The comparator 75 outputs a high level signal in the event that the count number N obtained by the counter 74 exceeds a predetermined number $N_0$ set by a reference terminal 85, and the predetermined number $N_0$ is set to be, for example, 5 times.

The engagement characteristic selecting means 76 selects an engagement characteristic for the hydraulic clutch C based on the outputs from the slip detecting means 71 and the comparator 75. In this engagement characteristic selecting means 76 there are multiple predetermined engagement characteristics wherein the responsiveness of the torque transmission by the hydraulic clutch C varies, that is, the first and second engagement characteristics in the present embodiment; the first engagement characteristic enhances the responsiveness of the torque transmission by the hydraulic clutch C by increasing the oil pressure of the hydraulic pressure chamber 29 so as to increase the engagement force relative to the difference in rotation between the first and second hydraulic pumps PF, PR, and the second engagement characteristic reduces the responsiveness of the torque transmission by the hydraulic clutch C by decreasing the oil pressure of the hydraulic pressure chamber 29 so as to decrease the engagement force relative to the difference in rotation between the first and second hydraulic pumps PF, PR. The engagement characteristic selecting means 76 thus outputs a high level signal when selecting the first engagement characteristic by setting a flag F to '1', which shows whether or not the first engagement characteristic is selected, and outputs a low level signal when selecting the second engagement characteristic by setting the flag F to '0'.

Figure 5:
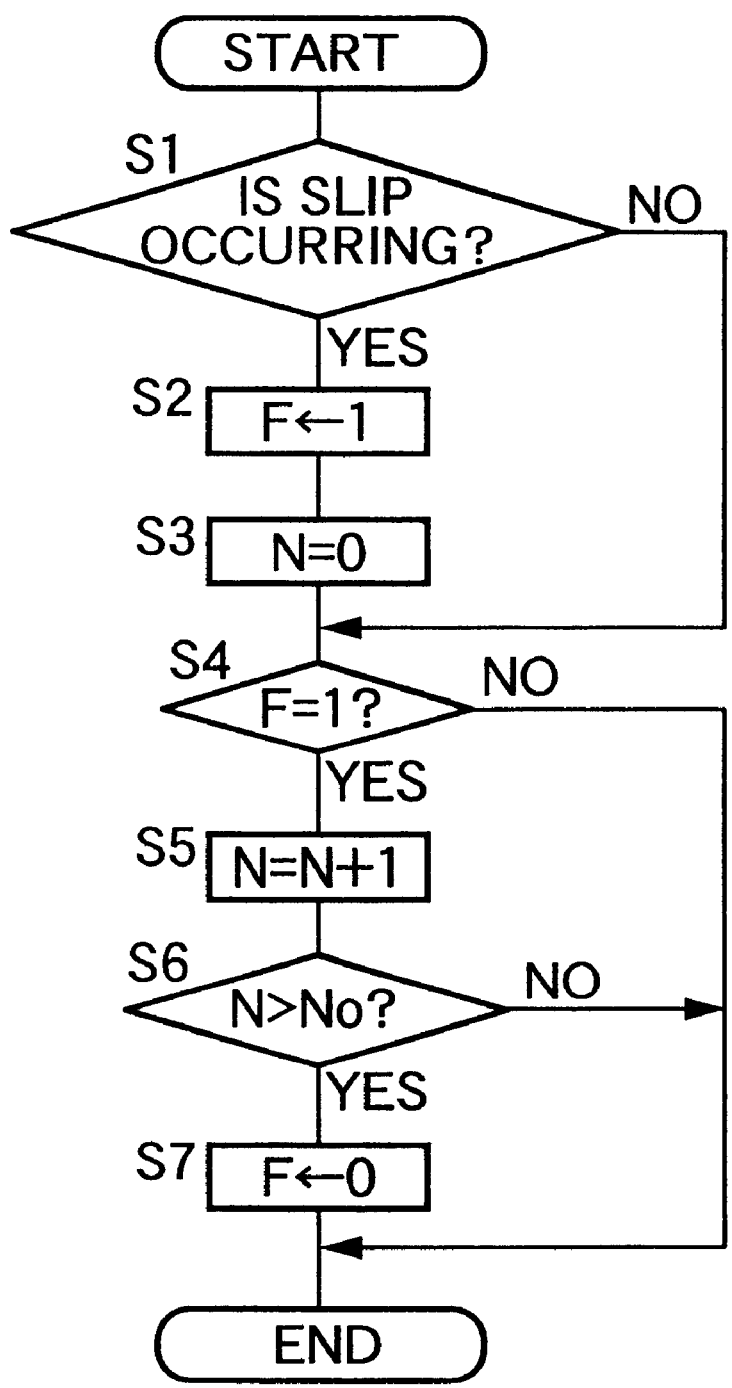

The processing in the engagement characteristic selecting means 76 and the counter 74 is carried out by the procedure shown in FIG. 5, and when it is confirmed in step S1 that the slip detecting means 71 is detecting a slip state, the flag F is set to '1' in step S2. The flag F is set to '1' in the initial state.

In the subsequent step S3, the count number of the counter 74 is reset to '0', and the procedure continues on to step S4. On the other hand, when it is determined in step S1 that the slip detecting means 71 is not detecting a slip state, the procedure moves to step S4 from step S1 bypassing steps S2 and S3.

In step S4, it is determined whether or not the flag F is set to '1'; if F=1 the count number N of the counter 74 is increased by '1' in step S5, and in the subsequent step S6 it is determined whether or not the count number N exceeds the predetermined number $N_0$. When it is confirmed that $N>N_0$, the procedure continues on to step S7 from step S6 and the flag F is set to '0'.

In accordance with the procedure shown in FIG. 5, the engagement characteristic selecting means 76 outputs a high level signal by setting the flag F to '1' in the initial state, and in accordance with the input of a high level signal from the comparator 75, that is, in the event that the count number N for the starting status of the vehicle exceeds a predetermined number $N_0$, the second engagement characteristic (F=0) is selected to set the output to a low level, and in the event that the slip detecting means 71 detects slip, the first engagement characteristic (F=1) is selected to set the output to a high level.

In the procedure, until slip is detected for the first time, the first engagement characteristic (F=1) is selected up to the time at which the count number N for the starting status of the vehicle reaches the predetermined number $N_0$, and thus the first engagement characteristic in which the responsiveness of the torque transmission by the hydraulic clutch C is enhanced is selected for starting until the predetermined number $N_0$ is reached, during which time the state of the road surface cannot be determined.

The output from the engagement characteristic selecting means 76 is input into an AND gate 77 and the output signals from NOT circuits 79, 82 and the comparator 80 are also input into the AND gate 77.

The NOT circuit 79 is for inverting the output from the comparator 78, and the comparator 78 outputs a high level signal when the vehicle body speed detected by the vehicle body speed detecting means 72 exceeds a threshold value for the vehicle body speed set by a reference terminal 86, for example, 20 km/h. The NOT circuit 79 therefore inputs a high level signal into the AND gate 77 when the vehicle body speed is not higher than the threshold value for the vehicle body speed (for example, 20 km/h).

The comparator 80 inputs a high level signal into the AND gate 77 when the degree of throttle opening $2_{TH}$ detected by the degree of throttle opening detecting means 68 exceeds a threshold value for the degree of throttle opening set by a reference terminal 87, for example, ⅙ open, that is to say, when the throttle pedal is depressed.

The NOT circuit 82 inverts the output signal from the ABS detecting means 69, and since the ABS detecting means 69 outputs a high level signal in an antilock brake operational state, the NOT circuit 82 inputs a high level signal into the AND gate 77 in a non-antilock brake operational state.

The output from the AND gate 77 is input into a driving means 83 for driving the switching valve 59, and when the output from the AND gate 77 is at a high level the driving means 83 closes the switching valve 59.

Figure 6:
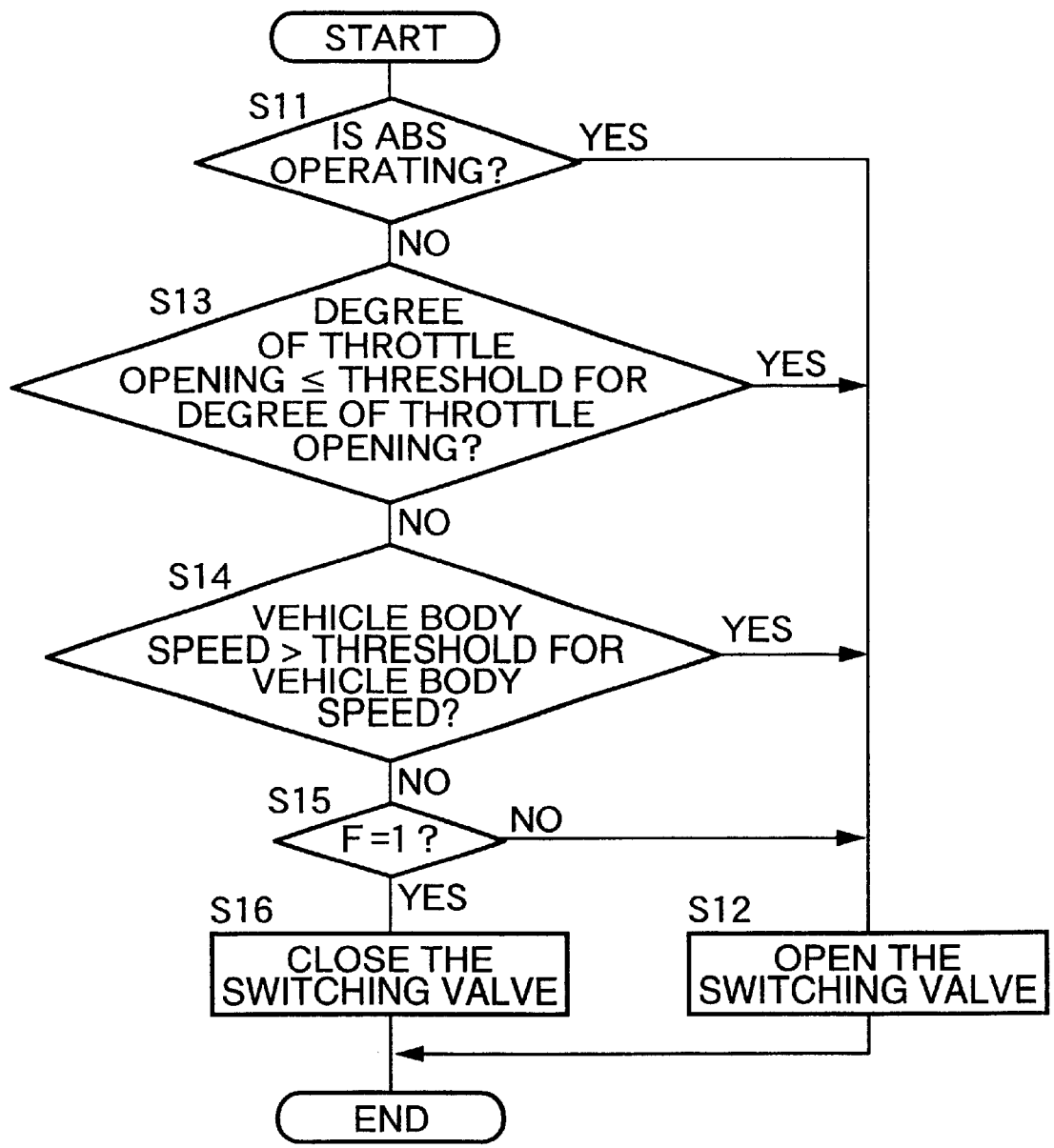

The processing in the AND gate 77 and the driving means 83 is carried out according to the procedure shown in FIG. 6; when it is confirmed in step S11 that the ABS detecting means 69 is detecting an antilock brake operational state, the switching valve 59 is opened in step S12, and when the ABS detecting means 69 is not detecting an antilock braking operational state, the procedure continues on to step S13.

In step S13, it is determined whether or not the degree of throttle opening $\theta_{TH}$ detected by the degree of throttle opening detecting means 68 is at or below the threshold for the degree of throttle opening; when the degree of throttle opening $\theta_{TH}$ is not higher than the threshold for the degree of throttle opening, the procedure continues on to step S12 from step S13, and when the degree of throttle opening $\theta_{TH}$ is higher than the threshold for the degree of throttle opening the procedure continues on to step S14 from step S13.

In step S14 it is determined whether or not the vehicle body speed detected by the vehicle body speed detecting means 72 exceeds a threshold value for the vehicle body speed; when the vehicle body speed is higher than the threshold value for the vehicle body speed, the procedure continues on to step S12 from step S14, and when the vehicle body speed is not higher than the threshold value for the vehicle body speed, the procedure continues on step S15 from step S14.

In step S15 it is determined whether or not the flag F is '1'; when F=0 the procedure continues on to step S12 from step S15, and when F=1 the procedure continues on to step S16 from step S15 to close the switching valve 59.

That is to say, the control unit 65 closes the switching valve 59 when (1) the engagement characteristic selecting means 76 selects the first engagement characteristic (F=1), (2) the vehicle body speed is not more than a threshold for the vehicle body speed (for example, 20 km/h), (3) the degree of throttle opening $\theta_{TH}$ exceeds a threshold for the degree of throttle opening (for example, ⅙ open) and (4) it is in the non-antilock brake operational state, and it opens the switching valve 59 when any one of the above-mentioned (1) to (4) is not satisfied.

Furthermore, the driving means 84 opens the normally closed electromagnetic valve 62 according to a switch signal from the switch 70 when selecting the two-wheel drive state.

The operation of this embodiment is explained below. When the vehicle starts traveling forwards, the driving force of the engine E is transmitted to the right and left front wheels WF, WF via the transmission 1, the front differential 2 and the drive shafts 3,3 so that both the right and left front wheels WF, WF are directly driven by the engine E. The driving force of the engine E is transmitted from the front differential 2 to the first hydraulic pump PF via the bevel gear 4 and the input shaft 5 so that the first hydraulic pump PF is driven by being operatively connected to the right and left front wheels WF, WF. At this stage, since the right and left rear wheels WR, WR also rotate in the forward direction in a state in which the front wheels WF, WF are not slipping, the second hydraulic pump PR is driven by being operatively connected to both the rear wheels WR, WR.

The hydraulic oil which has been taken into the second port 11 of the first hydraulic pump PF via the fifth one way valve 46 from the oil tank 36 by the operation of the first hydraulic pump PF, is discharged from the first port 10 to the first oil passage 14. The oil discharged from the first hydraulic pump PF is taken into the third port 12 of the second hydraulic pump PR by the operation of the second hydraulic pump PR; as a result of the discharge pressure of the second hydraulic pump PR, the spool valve 44 attains a state in which the second input port 49 and the second output port 50 are linked together and the oil discharged from the second hydraulic pump PR is taken into the first hydraulic pump PF via the fifth one way valve 46.

Thus, when slip occurs in the front wheels WF, WF after the vehicle has started in a state without slip in the front wheels WF, WF, and when slip occurs in the front wheels WF, WF when the vehicle is starting, if the discharge amount from the first hydraulic pump PF exceeds the intake amount into the second hydraulic pump PR, an amount of hydraulic oil corresponding to the difference between the discharge and intake amounts of the first and second hydraulic pumps PF, PR due to the difference in rotation between the two hydraulic pumps PF, PR is supplied to the hydraulic oil pressure chamber 29 of the hydraulic clutch C via the third oil passage 16, the hydraulic oil supply passage 31 and the choke type constriction 30.

At this stage, if a state exists in which the normally closed type electromagnetic valve 62 is closed and the switching valve 59 is open, the discharge of hydraulic oil from the hydraulic oil pressure chamber 29 is stopped down by the orifice 58; if a state exists in which the normally closed electromagnetic valve 62 is closed and the switching valve 59 is closed, the discharge of hydraulic oil from the hydraulic oil pressure chamber 29 is prevented by the closure of the switching valve 59. When the hydraulic clutch C engages in response to an increase in oil pressure in the hydraulic oil pressure chamber 29, the right and left rear wheels WR, WR are driven via the output shafts 6, the bevel gear 7, the rear differential 8 and the drive shafts 9,9, and the second hydraulic pump PR is driven by the output shaft 6 in response to the engagement of the hydraulic clutch C.

The engagement force of the hydraulic clutch C increases as the difference between the discharge and the intake amounts of the two hydraulic pumps PF, PR increases, and when it attains a state in which the difference in rotation between the front wheels WF and the rear wheels WR is substantially '0', for example, a state in which the vehicle is traveling in a straight line on an asphalt road surface, hydraulic oil is not supplied to the hydraulic oil pressure chamber 29 of the hydraulic clutch C and torque distribution to the rear wheels WR is stopped.

The engagement force of the hydraulic clutch C is controlled by the engagement force control means 57 by selecting from multiple engagement characteristics (two in this embodiment), in which the responsiveness of the torque transmission by the hydraulic clutch C is varied, according to the driving conditions. When the engagement force control means 57 selects the second engagement characteristic (a state where F=0) in which the switching valve 59 is open, the amount of hydraulic oil discharged from the hydraulic oil pressure chamber 29 is reduced by the orifice 58 so that, as shown by the broken line in FIG. 7, the engagement force of the hydraulic clutch C gradually increases according to an increase in the difference in rotation between the first and second hydraulic pumps PF, PR, that is to say, the responsiveness of the torque transmission by the hydraulic clutch C is reduced. At this stage, the maximum value $T_2$ for the transmission torque is determined by the predetermined relief pressure of the first relief valve 40.

Figure 7:
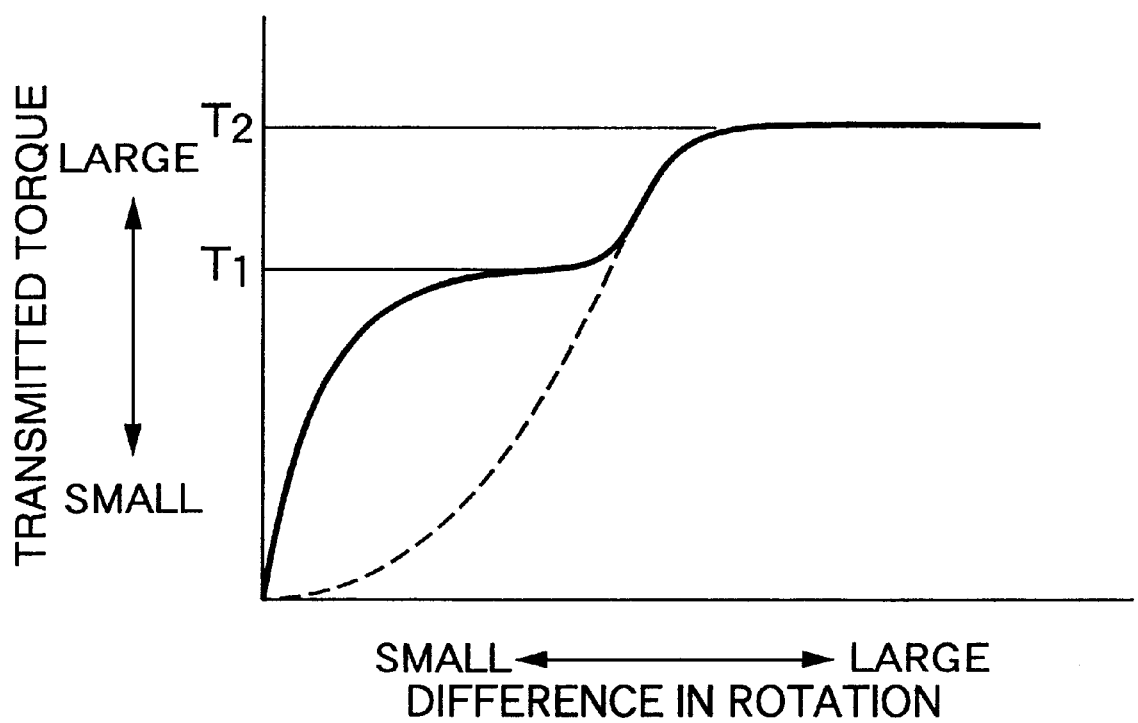

When the engagement force control means 57 selects the first engagement characteristic (a state where F=1) in which the switching valve 59 is closed, since discharge of hydraulic oil from the hydraulic oil pressure chamber 29 is prevented by the switching valve 59, as shown by the solid line in FIG. 7, the change in engagement force of the hydraulic clutch C relative to the change in the difference in rotation between the first and second hydraulic pumps PF, PR increases and thus the responsiveness of the torque transmission is enhanced.

The engagement force control means 57 thus controls the engagement force of the hydraulic clutch C by selecting the engagement characteristic according to the driving conditions of the vehicle and, therefore, the responsiveness of the torque transmission by the hydraulic clutch C can be controlled according to the driving conditions of the vehicle.

Moreover, in order to change the responsiveness of the torque transmission by the hydraulic clutch C, the engagement force control means 57 may include the orifice 58 provided in the drain oil passage 37 and the switching valve 59 provided between the orifice 58 and the hydraulic oil pressure chamber 29, and thus the arrangement of the engagement force control means 57 can be simplified.

Furthermore, the engagement force control means 57 includes the by-pass 60 which joins the orifice 58 to the hydraulic oil pressure chamber 29 when bypassing the switching valve 59, and the second relief valve 61 which is provided on the by-pass 60 so that it opens in the event that the oil pressure of the hydraulic oil pressure chamber 29 reaches at least a predetermined level. The upper limit for the oil pressure of the hydraulic oil pressure chamber 29 in a state in which the responsiveness of the torque transmission by the hydraulic clutch C is enhanced by closure of the switching valve 59, that is to say, the upper limit $T_1$ for the torque transmitted by the hydraulic clutch C (see FIG. 7) is determined by the valve opening pressure for the second relief valve 61, and thus excess torque transmission by the hydraulic clutch C in a state in which there is enhanced responsiveness, can be prevented by a simple arrangement.

The control unit 65 for controlling the opening and closing motions of the switching valve 59 in the engagement force control means 57 comprises the slip detecting means 71 for detecting slip in a front wheel WF, a starting status detecting means 73 for detecting the starting status of the vehicle, the counter 74 for counting the number of times that the starting status is detected in the starting status detecting means 73 and the engagement characteristic selecting means 76 for selecting an engagement characteristic in which the engagement force of the hydraulic clutch C is increased relative to the difference in rotation between the first and second hydraulic pumps PF, PR until the count number N of the counter 74 reaches a predetermined number $N_0$ after slip is detected by the slip detecting means 71.

When the slip detecting means 71 detects slip in a front wheel WF, the responsiveness of the torque transmission by the hydraulic clutch C is therefore enhanced until the number of times N that the starting status is detected by the starting status detecting means 73, reaches a predetermined number $N_0$. That is to say, when slip occurs in a front wheel WF on a road surface having a low coefficient of friction such as a snow-covered road, the responsiveness of the torque transmission is enhanced until the number N of times that the vehicle has started reaches a predetermined number $N_0$ by assuming that the vehicle will continue to travel on a road surface having a low coefficient of friction for a while, and thus the mobility of the vehicle can be enhanced. When slip occurs again in a front wheel WF, the responsiveness of the torque transmission is enhanced until the number of times N that the vehicle has started after slip has recurred reaches a predetermined number $N_0$, and thus it can deal with continuous travel on a road surface having a low coefficient of friction. Furthermore, when leaving a road surface having a low coefficient of friction, the engagement force of the hydraulic clutch C is controlled so as to employ an engagement characteristic having low responsiveness in order to suit a normal paved road, etc. unless the slip occurs even when the vehicle has started a predetermined number $N_0$ of times.

When braking the vehicle, the braking force is generally distributed so that it is higher on the front wheel WF side than on the rear wheel WR side, and therefore the front wheels WF lock before the rear wheels WR during rapid braking. Moreover, since engine braking during constant speed forward travel is applied only to the front wheels WF, the rotation of the front wheels WF transiently becomes lower than that of the rear wheels WR. In such a case, the amount discharged from the second hydraulic pump. PR exceeds the amount taken in by the first hydraulic pump PF and excess hydraulic oil is discharged into the second oil passage 15. In the case where the front wheels WF are completely locked, the total amount of discharge from the second hydraulic pump PR becomes excessive. The excess hydraulic oil therefore reflows into the third port 12 of the second hydraulic pump PR via the sixth oil passage 55, the fifth oil passage 35 and the third one way valve 34, and oil pressure based on the difference between the discharge and intake amounts of the two hydraulic pumps PF, PR would thus not be applied to the hydraulic oil pressure chamber 29 of the hydraulic clutch C, and therefore there would be no change caused in the braking force distribution between the front wheels WF and the rear wheels WR When the rotation of the front wheels WF becomes larger than that of the rear wheels WR during a reverse start or rapid reverse acceleration of the vehicle, oil pressure is caused in the second oil passage 15 based on the difference between the discharge and intake amounts of the two hydraulic pumps PF, PR, and the oil pressure is applied to the hydraulic oil pressure chamber 29 so as to engage the hydraulic clutch C. When a state of reverse travel at a constant speed, is thus attained due to an increase in rotation of the rear wheels WR, the rotations of the two hydraulic pumps PF, PR become identical, but since the discharge amount per rotation of the second hydraulic pump PR is set to be larger than the discharge amount per rotation of the first hydraulic pump PF, oil pressure corresponding to this difference is generated in the first oil passage 14 so working on the hydraulic oil pressure chamber 29. During reverse travel even in a state of travel at a constant speed, torque is therefore distributed from the front wheel WF side to the rear wheel WR side.

It is possible to change the predetermined number $N_0$ for the start number appropriately, and the predetermined number $N_0$ may be changed according to the front wheel driving force when the front wheels slip. Moreover, in the above embodiment, the front wheels WF are directly driven by the engine E and the rear wheels WR are driven via the hydraulic clutch C, but the present invention can also be applied to a four-wheel drive vehicle in which the rear wheels WR are driven directly by the engine E and the front wheels WF are driven via the hydraulic clutch C.

As hereinbefore described, in accordance with the present invention, the responsiveness of the torque transmission by the hydraulic clutch can be controlled according to the driving conditions of the vehicle. Further the arrangement of the engagement force control means can be simplified.

In addition, an upper limit for the oil pressure of the hydraulic oil pressure chamber in a state in which the responsiveness of the torque transmission by the hydraulic clutch is enhanced by closure of the switching valve, that is, an upper limit for the torque transmitted by the hydraulic clutch is determined by the valve opening pressure for the relief valve, and thus excess torque transmission by the hydraulic clutch in a state in which there is enhanced responsiveness can be prevented by a simple arrangement.

In the present invention, when slip occurs in one pair of the front or rear driven wheels on a road surface having a low coefficient of friction such as a snow-covered road, the responsiveness of the torque transmission is enhanced until the number of times that the vehicle has started reaches a predetermined number by assuming that the vehicle will continue to travel on the road surface having a low coefficient of friction for a while, and thus the mobility of the vehicle can be enhanced. When slip occurs again in one pair of the front or the rear driven wheels, the responsiveness of the torque transmission is enhanced until the number of times that the vehicle has started after the slip has recurred reaches a predetermined number, and thus continuous travel on a road surface having a low coefficient of friction can be dealt with. Furthermore, when leaving a road surface having a low coefficient of friction, the engagement force of the hydraulic clutch is controlled to employ an engagement characteristic having low responsiveness in order to suit a normal paved road, etc. unless the aforementioned slip is caused even when the vehicle repeats starting a predetermined number of times.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A driving force control device for a four-wheel drive vehicle having a prime mover, one pair of driven wheels driven directly by said prime mover, a hydraulic clutch, and another pair of driven wheels driven via said hydraulic clutch, said control device comprising:

a first hydraulic pump operatively connected to said one pair of driven wheels and driven thereby, a second hydraulic pump operatively connected to said another pair of driven wheels and driven thereby, wherein the engagement force of said hydraulic clutch is controlled based on the difference between the discharge and intake amounts of the first and second hydraulic pumps due to the difference in rotation of the two hydraulic pumps such that the engagement force increases according to an increase in the difference between discharge and intake amounts, an engagement force control means for controlling the engagement force of said hydraulic clutch by selecting from multiple engagement characteristics in which the responsiveness of the torque transmission by said hydraulic clutch is varied according to the driving conditions of the vehicle, and including a hydraulic oil supply passage for carrying the hydraulic oil produced in accordance with the difference between the discharge and intake amounts of said first and second hydraulic pumps, connected to a hydraulic oil pressure chamber in said hydraulic clutch, wherein said engagement force control means includes an orifice provided in a drain oil passage for draining the hydraulic oil in said hydraulic oil pressure chamber and a switching valve provided between said orifice and said hydraulic oil pressure chamber.

2. A driving force control device for a four-wheel drive vehicle according to claim 1, wherein:

said engagement force control means includes a bypass connecting said orifice and said hydraulic oil pressure chamber when bypassing said switching valve, and a relief valve provided on said bypass that open when the oil pressure on the side of said hydraulic oil pressure chamber reaches a predetermined level or greater.

3. A driving force control device for a four-wheel drive vehicle according to claim 1, including a control unit for controlling the motion of said engagement force control means, said control unit comprising:

a slip detecting means for detecting the slip of said one pair of driven wheels, a starting status detecting means for detecting the starting status of the vehicle, a counter for counting the number of times that the starting status is detected by said starting status detecting means, and an engagement characteristic selecting means for selecting an engagement characteristic in which the responsiveness of the torque transmission by said hydraulic clutch is enhanced until the count number of said counter reaches a predetermined number after the slip is detected by said slip detecting means.

4. A driving force control device for a four-wheel drive vehicle according to claim 1, including a control unit for controlling the motion of said engagement force control means, said control unit being operable to select an engagement characteristic in which the responsiveness of the torque transmission by said hydraulic clutch is enhanced, when a vehicle body speed is not more than a threshold, a degree of throttle opening exceeds a threshold, and an antilock brake device is not in an operated state.

* * * * *